Aug. 14, 1945.   C. S. ASH   2,381,857
DUAL WHEEL ASSEMBLY
Filed July 20, 1943
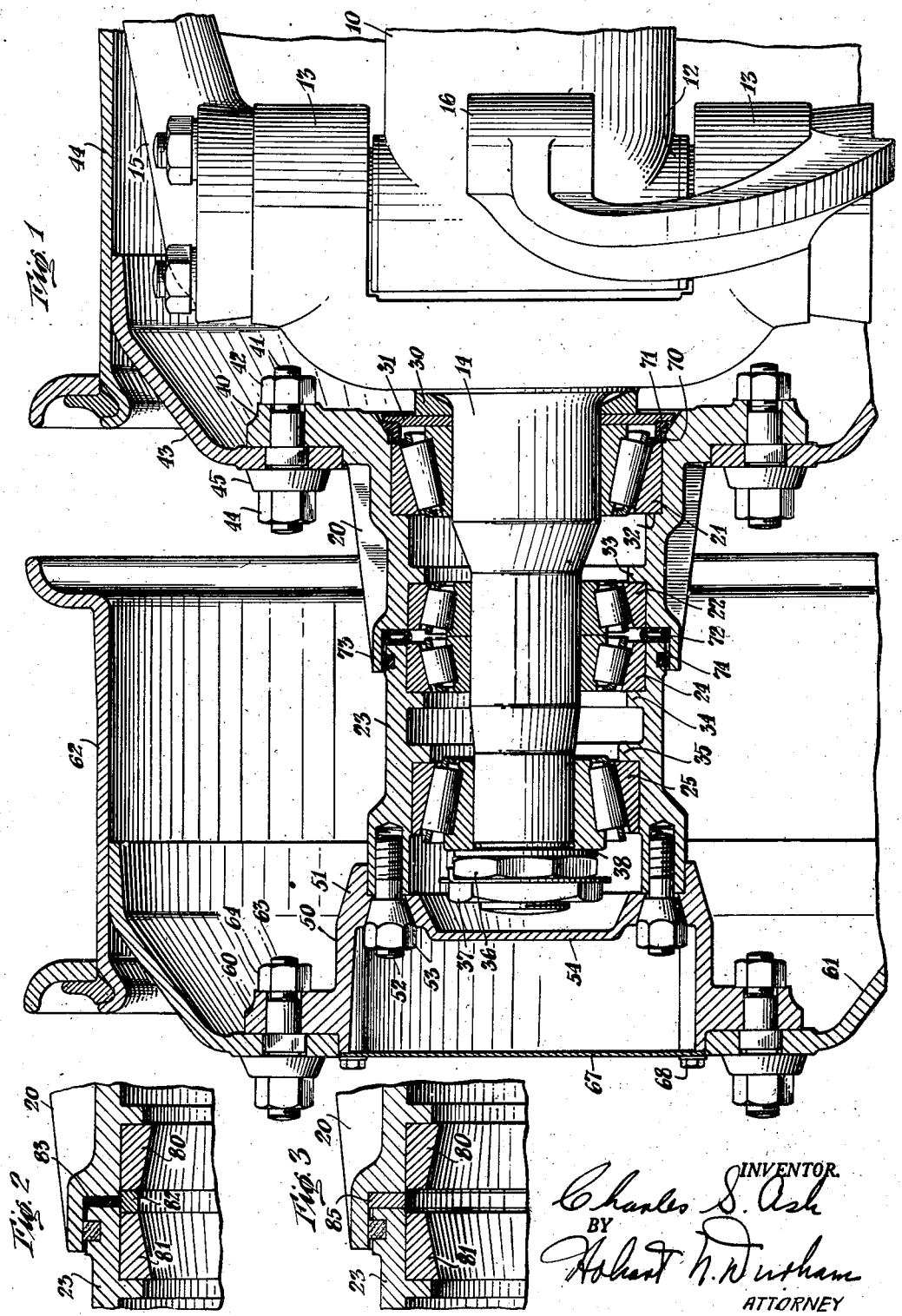
INVENTOR.
Charles S. Ash
BY
Robert N. Wurham
ATTORNEY Patented Aug. 14, 1945

2,381,857

UNITED STATES PATENT OFFICE 2,381,857

DUAL WHEEL ASSEMBLY

Charles S. Ash, Milford, Mich.

Application July 20, 1943, Serial No. 495,493

5 Claims. (Cl. 301—36)

The present invention relates to dual wheel assemblies and more particularly to assemblies in which the wheels are independently relatively rotatable.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawing, referred to herein and constituting a part hereof, illustrates one embodiment of the invention, and together with the description, serves to explain the principles of the invention.

It is an object of the present invention to provide an improved dual wheel assembly in which the individual wheels of the assembly are independently relatively rotatable. A further object is the provision of such a dual wheel assembly which is particularly adapted to use on heavy duty vehicles. The invention further provides an independently relatively rotatable dual wheel assembly having a substantial heavy duty hub and bearing structure. Still another object of the invention is the provision of a differential dual wheel assembly having duplicate web type wheels and in which the tires of the assembly are properly spaced apart. A further object is the provision of a dual wheel assembly having improved flotation in sand or mud. The invention further provides a differential dual wheel assembly in which the bearing structure is fully and adequately protected. Another object of the invention is the provision of an improved dual dirigible wheel assembly in which the wheels are independently relatively rotatable.

Of the drawing:

Fig. 1 is a longitudinal side view of a dual wheel assembly embodying the present invention certain parts being shown in cross section and other parts being shown in elevation;

Fig. 2 is a cross-sectional view of a modified embodiment of certain of the bearing and hub structure shown in Fig. 1; and Fig. 3 is a cross sectional view of still another embodiment of certain of the bearing and hub structure shown in Fig. 1.

Referring now in detail to the illustrative embodiment of the invention shown by way of example in the accompanying drawing, a dual wheel assembly in which the individual wheels of the pair are independently relatively rotatable is shown for use at the front or steering end of a vehicle. The axle beam 10 of the vehicle terminates in a steering knuckle member 12 upon which is mounted by king pin assembly the yoke arms 13 of a relatively long and substantial spindle 14. A steering arm 15 and tie rod arm 16 secured to the upper and lower yoke arms 13 respectively provide for dirigible movement of the spindle 14 at the end of axle 10.

A pair of wheel hubs are mounted for free relative rotation on the spindle 14. As embodied, the inner hub member 20 is rotatably mounted by means of a large inner anti-friction bearing 21 and a smaller outer anti-friction bearing 22. The outer hub member 23 is rotatably mounted on the spindle 14 in substantially cylindrical alignment beside the inner hub member by means of anti-friction bearing 24, which is a duplicate of bearing 22, and a large outer anti-friction bearing 25.

An annular shoulder 30 is provided at the inner end of spindle 14 and integral therewith, against which is positioned an annular plate 31. The inner bearing 21 of the bearing assembly is seated against plate 30 and against a shoulder 32 in the bore of inner hub member 20. The outer bearing 22 for the inner hub member is seated against an inwardly extending integral shoulder 33 of hub 20 and against the inner race of bearing 24. The latter bearing is seated against a shoulder 34 extending inwardly in the bore of outer hub member 23. The outer bearing 25 of the assembly seats against another inwardly extending shoulder 35 of hub member 23. The hubs and bearings are maintained securely in assembled position by means of nuts 36 and 37 threaded on the end of spindle 14, a washer 38 being positioned against the inner race of bearing 25.

The inner hub member 20 is provided at its inner end with a plurality of radially outwardly extending spokes 40 having wheel mounting bolts 41 secured therein by nuts 42. An inwardly dished wheel 43 having a pneumatic tire supporting rim 44 secured thereto is demountably mounted on mounting bolts 41 by means of nuts 44 and spacer members 45.

A hub extension member 50 is provided at the outer end of the assembly for mounting the outer wheel of the pair. As embodied, the extension member 50 has a thickened and reinforced portion 51 at its inner end provided with frusto-conically formed apertures to receive bolts 52 and cooperatingly formed frusto-conical nuts 53.

The bolts 52 are threaded into the end of the hub member, demountably mounting the hub extension member 50 on the hub 23 at its outer end for correlative rotation therewith. The extension member 50 has an integral cap 54 over its inner end sealing the outer end of the hub bearing assembly.

The extension member 50 is provided with a plurality of radially outwardly extending spokes 60 at its outer end. An inwardly dished wheel 61 having a tire supporting rim 62 is demountably mounted on the extension member 50 by means of mounting bolts 63, nuts 64 and 65, and spacer members 66. The wheel 61 with rim 62 is preferably a duplicate of the inner wheel 43 and rim 44 of the assembly.

A cover plate 67 may be placed over the outer end of extension member 50 and secured with top bolts 68, in order to prevent accumulation of dirt and mud within the extension.

The hub bearing assembly is sealed at the inner end of the assembly by means of a washer 70 and a packing ring 71. Centrally of the assembly the bearing mechanism is sealed by a hollow packing ring 72, and by a cylindrical portion 73 at the outer end of hub member 20 which overlaps the inner end of hub 23. A packing ring 74 positioned in a circumferential groove in hub 23 and contacting portion 73 of hub 20 further seals the bearings from loss of lubricant and entrance of dust and moisture.

Fig. 2 shows a modified embodiment of the construction between the hubs 20 and 23. In this embodiment the outer races 80 and 81 for the adjacent anti-friction bearings of the assembly do not extend entirely to the ends of their respective hubs, and a substantial thrust washer 82 is positioned between them. The thrust washer 82 serves to space apart the adjacent bearings of the assembly, to seal off the spacer between the hubs, and to support the hub ends in case of failure of one or both of the bearings. A further sealing ring 83 may be positioned between the hub ends.

In the embodiment of Fig. 3 a thrust washer 85 is located between the adjacent ends of hubs 20 and 23 and serves both to seal off the bearing structure and to take the thrust between the hubs.

With the dual wheel assembly shown and described it is apparent that a sturdy construction has been provided suitable for use on the heaviest vehicles. A relatively long and heavy duty spindle is provided and the wheel hubs are mounted in side by side relation thereon for free independent rotation, the bearings being suitably sealed and protected. The assembly of the present invention allows the use of duplicate demountable-at-the-hub type of wheels, and these are both inwardly dished to improve flotation and movement of the assembly in deep sand or mud, but at the same time the tires carried by the wheels are properly and conventionally spaced apart. The dual wheel hubs are mounted side by side on a spindle and each hub has individual anti-friction bearings. The steering efficiency of the king pin and knuckle assembly is thus increased and the control of the vehicle improved.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel assembly comprising, in combination, a spindle, a pair of wheel hubs journalled on the spindle for free independent relative rotation, said hubs being in substantially cylindrical alignment, a hub extension member removably secured to the outer end of the outer hub, and a pair of inwardly dished wheels one removably secured to the outer end of the extension and the other removably secured to the inner end of the inner hub.

2. A dual wheel assembly comprising, in combination, a pair of hubs mounted side by side for free independent rotation, an extension member removably secured to the outer end of the outer hub, and a pair of wheels one demountably mounted on the extension and the other demountably mounted on the inner hub.

3. A dual wheel assembly comprising, in combination, a spindle, a pair of wheel hubs mounted on the spindle in side by side relation for independent relative rotation, bearing means for the hubs comprising an anti-friction bearing adjacent the inner end of the outer hub and a second anti-friction bearing adjacent the outer end of the inner hub, and a thrust bearing between the anti-friction bearings supporting said ends of said hubs.

4. A dual vehicle wheel assembly comprising, in combination, a vehicle axle, a spindle dirigibly mounted at the end of the axle for steering movement, a pair of substantially cylindrical hubs mounted on the spindle in side by side relation for independent relative rotation, a pair of anti-friction bearings on the spindle for each hub, the anti-friction bearings of each pair of bearings being positioned at either end of their respective hub and a hub extension removably secured to the outer end of the outer hub and on the outer end of which a wheel may be mounted, said other hub having means on which another wheel may be mounted.

5. A dual vehicle wheel assembly comprising, in combination, a spindle pivotally mounted for dirigible movement in steering the vehicle, a pair of substantially cylindrical wheel hubs mounted on the spindle in side by side relation for independent relative rotation, a pair of anti-friction bearings on the spindle for each hub the anti-friction bearings of each pair of bearings being positioned at either end of their respective hub, and a thrust bearing between the adjacent anti-friction bearings of the pairs of bearings, said thrust bearing supporting adjacent ends of said hubs.

CHARLES S. ASH.